No. 690,005. Patented Dec. 31, 1901.
W. C. ANDERSON & J. L. SWINK.
APPARATUS FOR PREPARING PRUNES.
(Application filed Mar. 5, 1901.)
(No Model.)
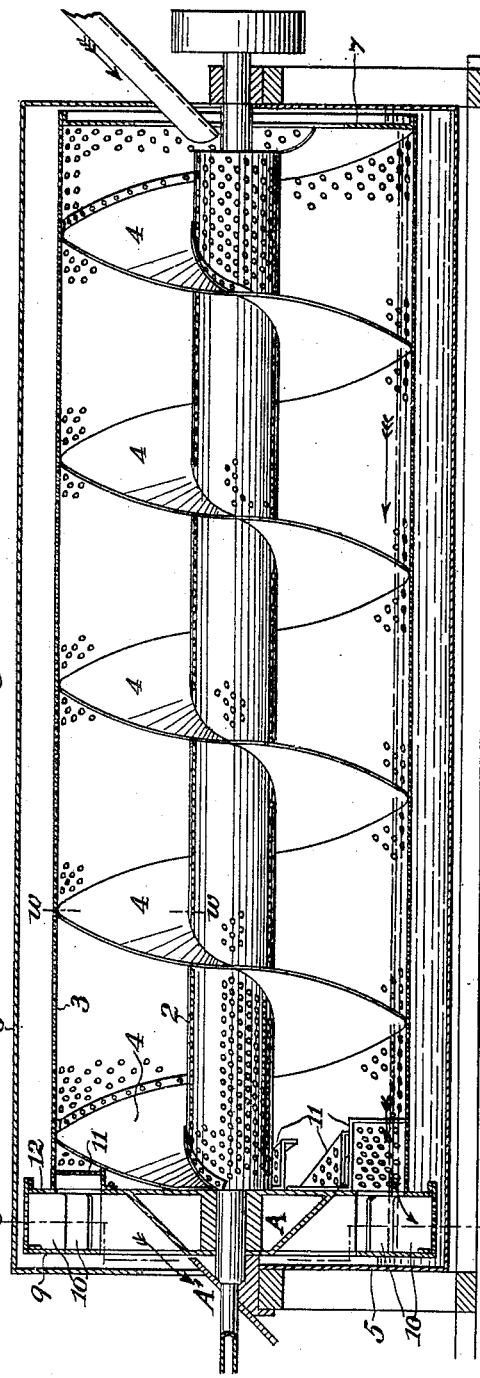
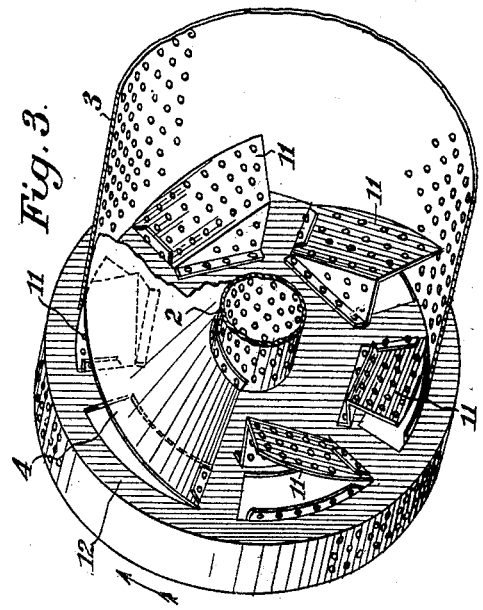
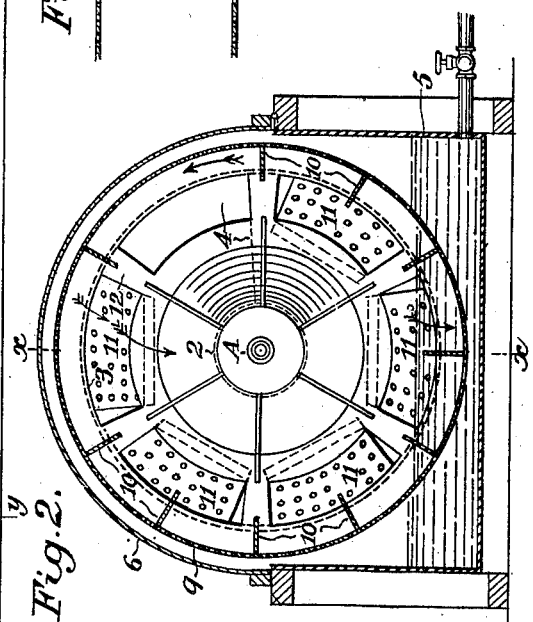
Witnesses,
E. A. Brandau
Inventors,
William C. Anderson
James L. Swink
By Dewey Strong & Co
Attys

UNITED STATES PATENT OFFICE.

WILLIAM C. ANDERSON AND JAMES L. SWINK, OF SAN JOSE, CALIFORNIA, ASSIGNORS TO ANDERSON PRUNE DIPPER CO., OF SANTA CLARA, CALIFORNIA, A CORPORATION OF CALIFORNIA.

APPARATUS FOR PREPARING PRUNES.

SPECIFICATION forming part of Letters Patent No. 690,005, dated December 31, 1901.

Application filed March 5, 1901. Serial No. 49,752. (No model.)

*To all whom it may concern:*

Be it known that we, WILLIAM C. ANDERSON and JAMES L. SWINK, citizens of the United States, residing at San Jose, county of Santa Clara, State of California, have invented an Improvement in Apparatus for Preparing Prunes; and we hereby declare the following to be a full, clear, and exact description of the same.

Our invention relates to an apparatus which is designed for the preparation of dried prunes and like fruits by subjecting them to hot water or steam; and it consists of concentric horizontally-journaled cylinders mounted upon a shaft and revoluble in unison, a spiral conveyer located between the cylinders, a tank within which the device is journaled and through which hot water or steam may be applied to the fruit, means for delivering the fruit to the spiral conveyer, and means for discharging the fruit at the opposite end of the conveyer.

It also comprises details of construction which will be more fully explained by reference to the accompanying drawings, in which—

Figure 1 is a longitudinal section on the line *x x*, Fig. 2, of our apparatus. Fig. 2 is a transverse section on the line *y y* of Fig. 1. Fig. 3 is a perspective view of the enlarged part of the cylinder, showing the collecting-blades. Fig. 4 is a transverse section at *w w*, Fig. 1.

Prunes which have been prepared and dried for the market are sometimes coated with a deposit of sugar, and they are often too hard to be marketable in their best condition, and they sometimes have germs upon them which it is desirable to destroy. For these and other purposes the prunes are subjected to hot water or steam for a short time sufficient to dissolve the sugar-coating, destroy the germs, and to cause the prunes to swell slightly and soften without making them too soft to be marketable or destroy the saccharine quality. This has usually been effected by means of dippers in which the prunes are placed and then submerged in the hot water for a length of time, depending upon the judgment of the operator. This is a slow and intermittent process, and our present invention is designed to provide a continuous automatically-discharging apparatus through which the fruit is conducted and exposed to the hot water or steam for a length of time, depending on the character of the particular lot of fruit being treated.

A is a central shaft carrying upon it a cylinder 2, and 3 is an exterior cylinder of larger diameter, suitably connected so as to be revoluble with the inner cylinder and shaft. Between the inner and outer cylinders is a spiral conductor 4, which is properly flanged around its inner periphery, so that it can be nailed or otherwise secured to the inner cylinder, and upon the outer periphery, so that it can be riveted to the outer cylinder. This outer cylinder may be made of any suitable material. We have found a very satisfactory material to be perforated sheet metal or screen, which being riveted to the periphery of the spiral conductor retains it in its proper shape, makes a rigid connection with the inner cylinder, so that the whole apparatus revolves together, and provides sufficient openings so that water or steam will have access to the fruit which is being passed between the cylinders. The shaft A is suitably journaled so that the cylinder dips into a tank 5, and this tank may contain hot water of sufficient depth to submerge the lower part of the cylinders and the fruit which is being conveyed between them, or in some cases where steam is to be employed the surface of the water may be lowered, and the steam-jet being turned into the water the vapor arising from the water will pass into the cylinder and permeate the fruit. In either case the cap or cover 6 will be fitted to the top of the tank, so as to inclose the cylinder and keep the steam or vapor within it, and in case steam alone is used the shaft A may be made hollow and at one end connected by a suitable steam-joint with a stationary supply-pipe which stands in line with it, so that steam may also be introduced into the interior of the mass of fruit, as well as being applied to the outside through the water-bath. The outer cylinder extends beyond the inner one at the receiving end, so that the spiral blade continuing its direction and curvature passes beyond the inner cylinder and connects with the annular end 7 of the outer cylinder. This annular end has a central opening of sufficient size, and the fruit may be delivered into this opening either by a chute or by a continuously-traveling elevator or by any well-known or suitable means, and the fruit falling into the lower part of the cylinder is immediately taken by the conveyer and carried between the two cylinders. This insures the submerging of all the fruit, as well as causing it to travel from one end to the other, and this enforced submergence is necessary, because many of the prunes are light enough to float if allowed to do so. The rate of revolution of the cylinder will depend upon the character of the fruit supplied. Some fruit which is treated at the early part of the drying season is sufficiently soft to need but a short subjection to the heating, while fruit which has been longer dried and is sometimes quite hard will need to be steamed or moistened for a longer period. By means of cone driving pulleys and belts or equivalent motors the rate of speed of the cylinder can be varied to suit these conditions.

At the discharge end of the apparatus the interior and exterior cylinders 2 and 3 terminate in approximately the same plane, and exterior to the ends of these cylinders is a cylindrical receiver 9 of larger diameter than the outer cylinder 3, forming, as it were, an offset from this cylinder. Within this enlarged chamber are radial partitions 10, forming pockets around the interior of this chamber, and a conical surface extends from the end of the cylinder 3, converging to the outer end of the receiving-chamber, so as to assist in the discharge of the fruit as the cylinder revolves by causing it to slide down this cone. Ribs are fixed upon said cone, so that when the fruit has been raised by the revolution of the cylinder to the point where it will fall upon the surface of the cone it will slide down the incline and into a receiver at the outside. In order to make the discharge as even and regular as possible, we have shown a series of collecting-blades 11. These blades are shown in the form of tongues projecting from a disk 12, and these tongues are made of different lengths, because the end of the conducting-spiral terminates at the end of the cylinders 2 and 3, while from its shape it continually recedes from that end in its revolution around the inner cylinder. This leaves a considerable space between the spiral and the end of the cylinder, and if all the fruit in that space were discharged at once into the outer receiving-chamber there would be too large a mass at one part of the revolution, while at the end of the spiral there would be little or no fruit to be delivered, and this would make an irregular delivery as the cylinder rotates. We therefore make the tongues which project into the space between the two cylinders of different lengths and increasing, so that each one of them takes a portion of the mass of fruit which is being brought forward by the spiral. Thus at the point where the spiral is at the greatest distance from the discharge end of the cylinders the longest tongue would be located, and this would take a portion of the fruit and bring it forward into the outer chamber at a point where the outer end of the spiral had terminated and there would be no fruit brought forward by it. Each of the subsequent tongues would be a little higher than the first one named and the discharge of the fruit would be thus quite equally divided.

Having thus described our invention, what we claim as new, and desire to secure by Letters Patent, is—

1. An apparatus for softening and preparing prunes and the like, consisting of two horizontally-journaled concentric cylinders, a spiral conducting-blade fixed between said cylinders, one of said cylinders having its receiving end extending beyond the corresponding end of the other cylinder so that the spiral blade may continue its direction and curvature and pass beyond the inner cylinder and connect with the head of the outer cylinder, and means for admitting the material to this end of the apparatus, a water-tank within which the lower part of the cylinders is revoluble, and means for supplying the fruit at one end and discharging it at the opposite end.

2. An apparatus for softening and preparing prunes consisting of horizontally-journaled concentric cylinders, the outer one of which is perforated and extending beyond the inner one at the receiving end, a spiral conveying-blade located between the two cylinders and continuing to the receiving end of the outer cylinder, a tank within which the cylinders are journaled so that the lower part may be submerged, and a means for discharging the fruit at the opposite end of the cylinders.

3. An apparatus for preparing and softening prunes, consisting of horizontally-journaled concentric cylinders having a spiral conveyer lying between them, a circular receiver of larger diameter than the outer cylinder at the discharge end having radial divisions fixed therein, a receiving-cone having ribs upon its surface upon which the fruit is received and delivered from the end of the apparatus, and buckets on the outer head of the cylinders and projecting to variable distances into the space therebetween and adapted to divide the fruit and gradually deliver the fruit to the cone.

4. An apparatus for preparing prunes consisting of concentric cylinders having a spiral conveyer between them, and a water-tank in which the lower part of the cylinders is revoluble, a chambered receiver of larger diameter connected with the discharge end of the outer cylinder, a cone convergent outwardly from the discharge end of the outer cylinder and having longitudinal ribs upon its surface, and a disk with buckets projecting between the outer and inner cylinders and acting to lift and discharge the prunes upon the cone, said buckets projecting to different distances into the space between the two cylinders and adapted to divide the fruit and conduct it gradually to the discharge-cone.

5. An apparatus for preparing prunes consisting of horizontally-journaled concentric cylinders, a tank in which the lower part of the cylinders is revoluble, a spiral conveyer extending from end to end between the cylinders, a disk having inclined buckets of different lengths projecting from the discharge end of the cylinder into the space between the two whereby the mass of fruit conveyed by the spiral is divided and gradually discharged and a conducting-cone upon which the fruit falls when raised to the upper part, radial ribs extending longitudinally upon the surface of the cone, serving as guides by which the fruit is directed outside of the apparatus.

6. An apparatus for preparing prunes, and the like, consisting of concentric cylinders with a spiral conveyer fixed between them so as to revolve therewith, and feed and discharge devices, an inclosing casing, and means for introducing steam to the interior of the inner cylinder and outside the exterior cylinder.

In witness whereof we have hereunto set our hands.

WILLIAM C. ANDERSON.
JAMES L. SWINK.

Witnesses:
F. L. BURRELL,
W. D. GAREY.